United States Patent Office 3,262,360
Patented July 26, 1966

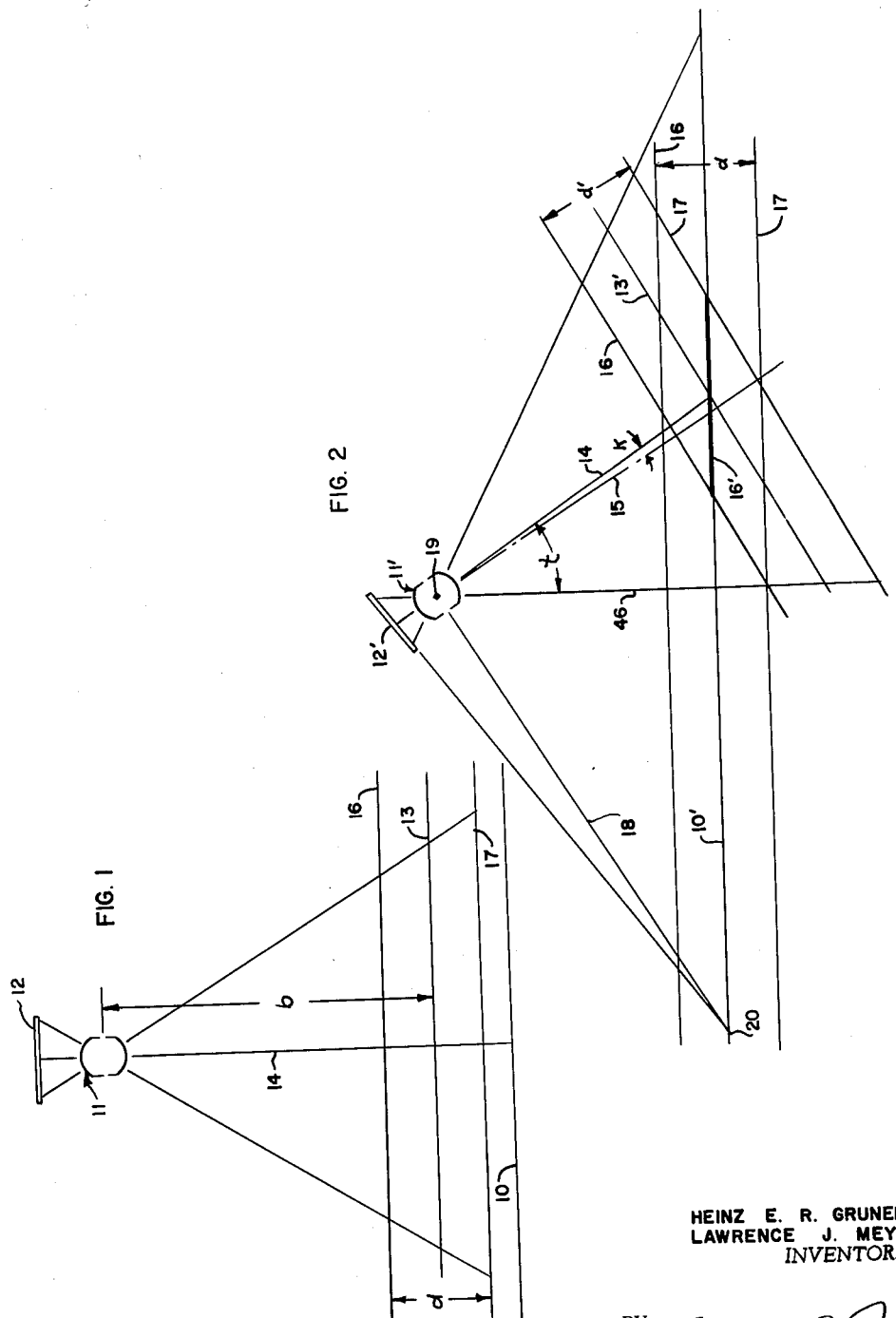

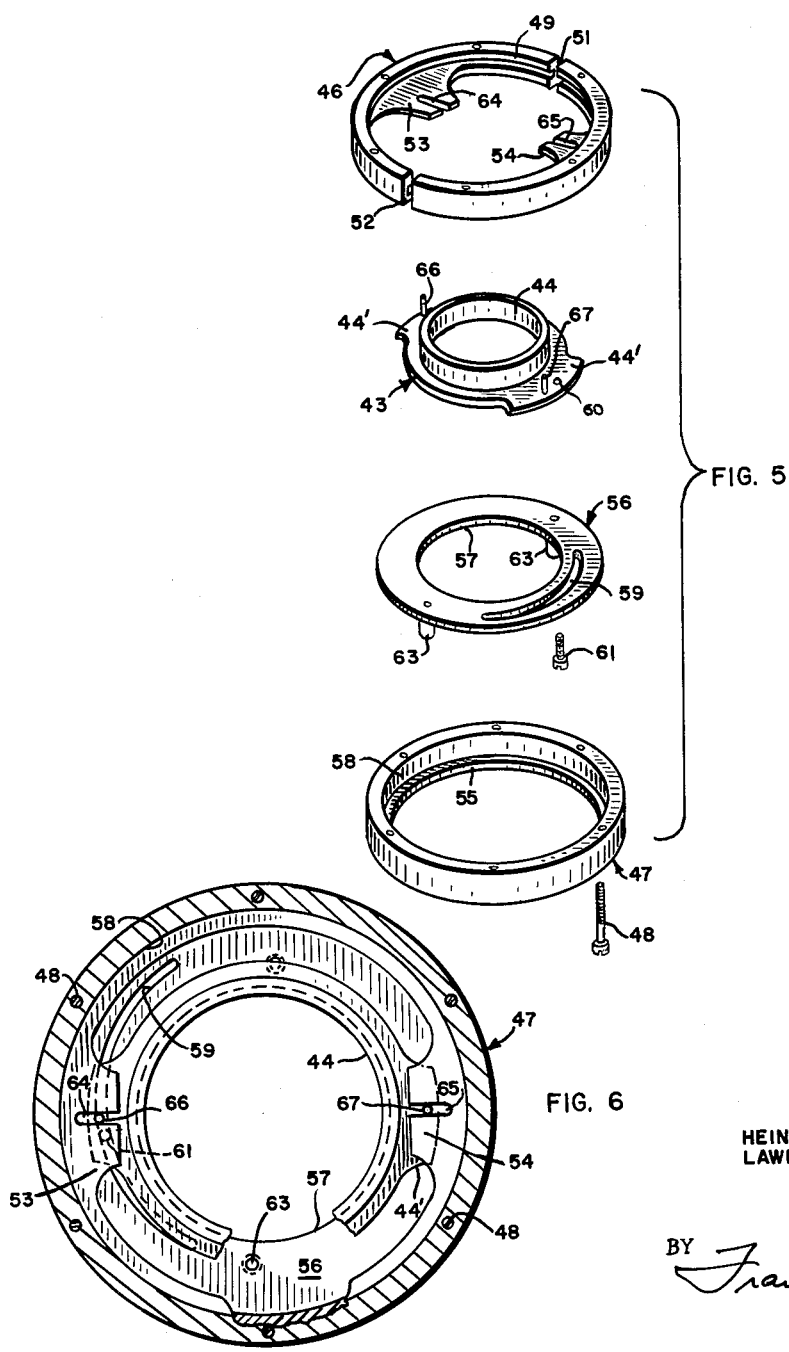

3,262,360
TILTABLE LENS MOUNTING FOR OPTICAL PROJECTORS
Heinz E. R. Gruner, Irondequoit, and Lawrence J. Meyers, Brighton, N.Y., assignors to Bausch & Lomb Incorporated, Rochester, N.Y., a corporation of New York
Filed Mar. 16, 1964, Ser. No. 351,991
5 Claims. (Cl. 88—24)

This invention relates to lens mountings for optical projectors such as photogrammetric stereoplotters and similar devices and it relates more particularly to improvements in the mechanism for tilting the optical axis of the lens held therein.

Mechanisms for tilting the optical axis of a photogrammetric projection lens are known in the art as shown interalia in the U.S. Patent No. 2,723,593 issued on November 15, 1955 to H. E. R. Gruner, and although such mechanisms have the advantages of simplicity and low cost, a somewhat more complex mechanism is indicated if improvements are to be made in accessibility and reliability of the tilt adjustment mechanism.

It is an object of the present invention to provide a lens tilting mechanism having such advantages over the prior art as greater tilt range and sensitivity of adjustment as well as having easy accessibility of the manually actuated part of the adjustment mechanism.

Other objects and advantages are to provide the aforesaid lens tilting mechanisms having positive and reliable action, and having rugged and compact construction.

Further objects and advantages will be apparent to those skilled in the photogrammetric and kindred arts from the combination, arrangement and construction of its parts as described herebelow when taken in connection with the accompanying drawings, wherein:

FIGS. 1 and 2 are optical diagrams illustrating projection conditions in photogrammetric stereoplotters;

FIG. 5 is an exploded perspective view of certain operating parts of said invention; and FIG. 6 is a cross-sectional view of the assembled tilting mechanism per se which is shown in FIG. 5 in assembled condition, the level of the section being indicated by the line 6—6 of FIG. 3.

Figure 3:
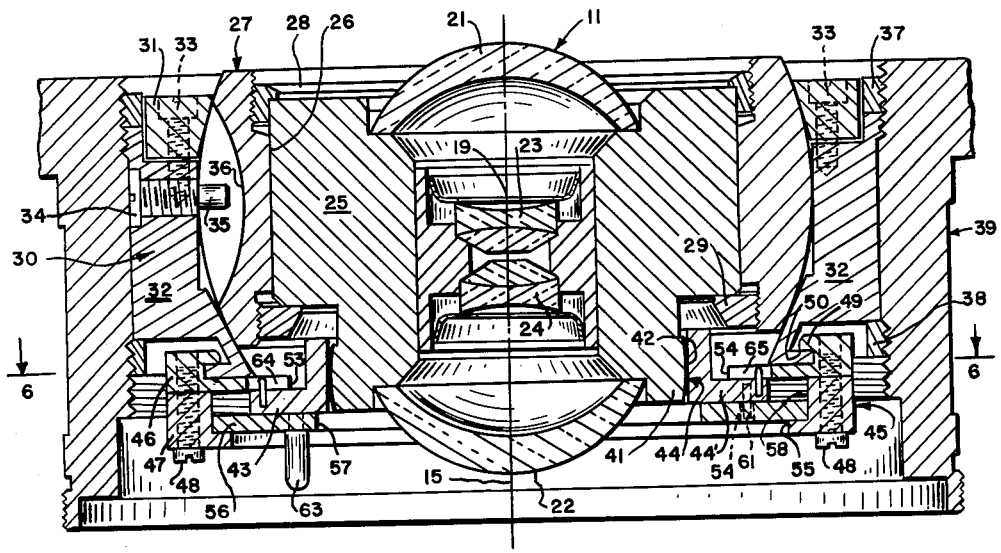
FIG. 3 is a midsectional view of a lens mounting showing one form of the present invention, parts thereof being broken away.

Ordinarily, a photogrammetric stereoplotter apparatus utilizes a series of laterally spaced projectors, not shown, which are arranged above a working surface 10 as shown diagrammatically in FIG. 1 of the drawing. Herein the projection lens 11 of the projector forms an image of a photographic diapositive 12 in the plane of sharp focus 13 which is normal to an erect optical axis 14. In cases where oblique projection of diapositive 12 corresponding to the taking angle "*t*" is necessary, as shown in FIG. 2, the optical axis 14 of the projector lens 11 must be tilted from its normal direction by a small angle K. This procedure results in good imagery as long as the so-called Scheimpflug condition is satisfied. The Scheimpflug condition is schematically shown in FIG. 2 wherein the projector which holds the diapositive 12' is inclined at an angle "*t*" so as to project an image thereof onto a horizontal working surface 10'. The projection lens 11' in FIG. 2 when in its neutral position has a depth of focus "*d*" indicated by the limit lines 16–17 which lie equidistant from the inclined plane of sharp focus 13'. Such portion of said image which falls upon the working surface 10' within the depth of focus "*d*" and shown by a heavy black line 16' would then be considered in acceptable focus, but the outer portion of the projected image would be lost. The Scheimpflug condition corrects this loss of focus and makes the entire photographic image appear in sharp focus on the work surface 10'. It is satisfied when the plane of the object or disapositive 12, the plane 18 which is normal to the optical axis 15 of the projection lens 11, and the plane of the image surface 16' all intersect at a locus of intersection 20. The depth of focus zone is thereby turned into such a position that the limiting planes 16 and 17 appear to be parallel to the working surface 10'.

The direction in which the lens axis 15 shall deviate from the projector axis 14 depends on the rotational orientation of the projector. Since this direction varies from photo to photo, the lens mount provides for lens tilting in any chosen direction and is therefore of spherical shape. For reasons of preservation of the interior orientation, the rotational center of the spherical lens mount must coincide with the internal perspective center of the projector, i.e., the first nodal point 19 of the projector lens. Provisions are therefore necessary to place the lens 11, which is seated in a cylindrical bore of the spherical mount, axially in such a position that coincidence of the spherical center and the nodal point is achieved.

The settings of the tilt angle K and the direction of tilt are not very critical and do not require computations and means for precise angular settings. Ocular inspection of the resulting image quality within the field of projection is considered adequate.

Figure 4:
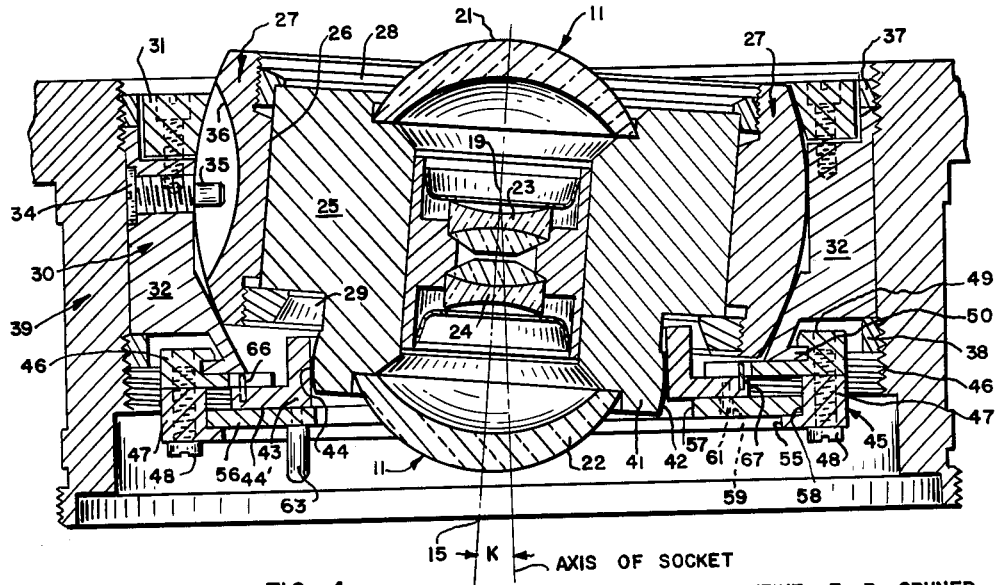
FIG. 4 is a sectional view similar to FIG. 3 showing the lens mounting in tilted condition.

According to this invention, the aforesaid lens 11, which for purposes of illustration as shown in FIGS. 3 and 4 is composed of a pair of singlet lenses 21 and 22 and a pair of compound lenses 23 and 24, is held in a cylindrical barrel 25 in any preferred manner, such as cementing or otherwise. The first nodal point 19 of said lens 11 is shown in FIGS. 3 and 4. Lens barrel 25 is fixed into the cylindrical bore 26 of a spherical mount 27 within which it is adjustably held between two retaining rings 28 and 29. Spherical mount 27 in turn is cradled in a two-part cage 30 having mating parts 31 and 32 on which tangent frusto-conical contact surfaces are formed to confine the spherical mount 27. Both parts 31 and 32 together form a socket, the parts being clamped together by several screw bolts 33. The lens 11 can be tilted in said socket in any direction but is prevented from rotating about axis 15 by a set screw 34 having a pilot 35 which closely engages a radial slot 36 formed longitudinally in the spherical mount 27. Said spherical mount is held in any preferred manner, such as the clamping rings 37 and 38 in a frame member 39.

A leading feature of the present invention concerns the tilting mechanism by which the spherical mounting 27 is tilted in any direction about the nodal point 19 on the axis 15.

Said tilting mechanism is shown in FIG. 3 as it appears when the lens axis 15 is erect, and in FIG. 4 the lens 11 is shown in tilted position.

The tilting mechanism comprises a circular flange or rim 41 which is part of the lens holding barrel 25 and is concentric with its axis 15. Peripherally on the flange 41, a substantially spherical contact surface 42 is formed. The flange 41 is directly contacted by a laterally shiftable contact ring 43 which is provided with a circular inner contact wall 44 slidably fitted to the spherical contact surface 42 and is also provided with a radial flange 44'. Support of the contact ring 43 is effected by a stationary mounting ring member 45 comprising an upper and a lower ring-like part which are designated 46 and 47 respectively and are held together by a plurality of cap screws 48 around the rim thereof.

The ring member 45 is hung on the stationary lower cage member 32 by a swivel connection which is cooperatively formed by the overlapping inwardly projecting radial flange 49 on part 46 which contacts an outwardly projecting radial flange 50 formed on the lower side of cage member 32. To permit assembly of said swivel connection, the upper part 46 is split at 51 and 52 so that it may be assembled in halves. Two partial flanges or ledges 53 and 54 which project radially inwardly are formed opposite to each other on the upper ring part 46. On the lower ring part 47 an inwardly projecting radial flange 55 is formed whereon rests a disk 56 having an open center portion 57, the disk being freely fitted for rotation within a cylindrical wall 58 formed in ring part 47.

Disk 56 is spaced from the partial flanges 53 and 54 and therebetween is slidably held the radial flange portions 44 of the shiftable ring 43. Rotatable disk 56 is an actuating part for tilting the lens holder 27 and acts through the contact ring 43 and depending flange 41. For this purpose, the rotatable actuating disk 56 is provided with a radially helical cam slot 59. In engagement with said cam slot 59 is a cam follower pin or screw 61 which is anchored in any preferred manner such as a tapped hole 62 in the flange 44'. Rotation of the actuating disk 56 is effected manually in any preferred manner such as fixing finger pegs or knobs 63 on the underside thereof.

In order to obtain a radial direction of motion of the cam follower pin 61 when the cam slot 59 is moved angularly, and thereby to establish a direction in azimuth of the transverse motion of the contact ring 56, the flanges 53 and 54 have individually formed thereon a pair of open-ended oppositely aligned slots 64 and 65 wherein are engaged respectively a pair of guide pins 66 and 67, said pins being firmly secured in the flanges 44 of the contact ring 43

It is not only necessary to guide the lateral movement of the contact ring 43 by the pins 66, 67 and slots 64, 65 but it is necessary also to provide adjustability of the angular direction of the slots in azimuth. This desirable feature is provided by the aforementioned swivel connection 49, 50 so that said ring member 45 may be manually rotated with respect to the socket cage 32 whereby the optical axis 15 may be tilted in an infinite number of directions within a small solid angle K as shown in FIGS. 4 and 2.

With regard to the operation of the lens tilting mechanism, the lens support member 27 may be tilted by applying pressure to the knob 63 which rotates the plate or disk 56 and its cam slot 59 so that the contact ring 43 and cam follower 61 are moved in the direction of the slots 64 and 65. If it is desired to orient the direction of tilt differently in azimuth, the mounting ring is manually rotated to a different angular position, the engagement of the flanges 49 and 50 being loose enough to permit such an adjustment but firm enough to maintain the adjustment under ordinary circumstances.

Although only certain forms and arrangements of the present invention have been shown and described in detail, other forms and arrangements are possible and changes may be made in the details of construction and substitutions made therein without departing from the spirit of the invention as defined in the appended claims.

We claim:

1. A tiltable type of lens mounting for photogrammetric apparatus comprising the combination of
   a lens holding member wherein a projection objective is secured,
   a support member having an interior annular surface formed thereon which is fitted to receive said lens holding member,
   a spherical surface formed on the exterior of said support member concentrically with a nodal point on said objective,
   a two-part annular socket member, the parts thereof bearing on the spherical surface above and below its maximum diameter and being secured to each other to retain said support member,
   a frusto-conical seating surface formed on the upper and lower parts of the socket member adjacent tangent to said spherical surface,
   at least one inwardly projecting pivot pin seated in said socket member, the axis of said pins passing substantially through a nodal point of said lens,
   at least one pair of elongated axially directed walls formed in parallel spaced relation to each other in said spherical surface so as to define a slot which is fitted to receive said pin whereby a rotational movement of the socket above the lens axis is prevented,
   means for mounting the socket member in said apparatus,
   an axially directed circular flange formed on the lower side of said lens holding member, said flange having a spherical outer contact surface formed thereon,
   an annular actuating member swivelly carried on the lower side of said socket member surrounding and spaced radially from said last-named spherical surface,
   a contact ring having a central cylindrical surface which is closely fitted to the said spherical contact surface and is operatively mounted to slide radially of said actuating member, and
   operating means including a pin and helical slot connection cooperatively carried by said contact ring and actuating member so as to cause lateral movement and consequent tilt of said lens holding member about said nodal point upon rotation of said actuating member.

2. An inclinable lens mounting for photogrammetric and similar projectors comprising
   a lens holding member wherein a projection objective is held,
   a support member encircling and retaining said lens holding member,
   means for securing the lens holding member within said support member,
   a spherical surface formed on the exterior of said support member concentrically with a nodal point of said objective,
   a socket member having a frusto-conical seating surface formed below the largest diameter of the spherical surface thereon on which said spherical surface rests so as to provide a ball and socket type of connection therewith,
   a pair of parallel walls defining a radial axially elongated slot which is formed in said spherical surface parallel to its axis,
   a protruding pivot formed on an interior surface of said socket member in alignment with a nodal point of said objective, said pivot being slidably fitted to said slot so that the socket member is prevented from rotating about the lens axis,
   a clamping ring having a tapered circular seating surface which bears above the largest diameter of the spherical surface,
   fastening means cooperatively constructed on said socket member and clamping ring to clamp the ring and socket member against said spherical surface,
   a mounting ring member,
   a swivel connection formed cooperatively on the adjacent parts of the mounting ring member and socket members whereby the ring member is rotatably mounted on the other member,
   a circular actuating disk having a large opening therein,
   means for rotatably mounting said disk in the mounting ring member adjacent to its lower side,
   a contact ring having a cylindrical contact surface which defines a central opening therein and having a peripheral radial flange formed thereon,
   a longitudinally extending circular flange constructed peripherally on the lower side of said lens holding member and projecting into operative engagement with said contact surface to transmit lateral tilting movement to the last-named member, means including a stationary plate and said rotatable actuating plate which are held in said mounting ring against the top and bottom surfaces of said radial flange for guiding said contact ring in its lateral motion, and a pin and slot connection including helical cam means cooperatively constructed on said radial flange of the contact ring and the rotatable actuating plate and being responsive to rotation of said last-named plate for effecting the lateral motion of said contact ring to incline the axis of said lens holding member and the objective held therein.

3. An inclinable lens mounting for photogrammetric projectors and the like comprising a lens holding member wherein a projection lens is secured, a longitudinally extending circular flange formed on the lower part of said lens holding member so as to project axially downwardly from the bottom of the member, a spherical surface formed on the outer wall of said flange, a support member encircling said lens holding member and means for clamping the lens holding member into said support member, a spherical surface formed on the exterior of said support member concentrically with a nodal point on the lens, a stationary socket member, a frusto-conical seating surface formed on the inner part of said socket member whereon said spherical surface bears to form part of a ball and socket connection, a plurality of mutually parallel longitudinal walls which constitute the sides of at least one longitudinal slot which is formed on said support member, the median axes of said slot being coplanar with said nodal point, at least one pivot pin secured in said socket member and slidably fitted respectively into said slot so as to prevent relative rotation therebetween about the axis of the support member while facilitating relative tilting of said lens in any direction, a circular mounting member swively carried on the lower part of the socket member, an inwardly projecting annular radial flange formed on the mounting member and an outwardly projecting radial flange formed on said socket member and engaging beneath the first radial flange so as to form a swivel connection between the members whereby the mounting member is hung on the socket member, a circular flat actuating disk rotatably mounted in a circular counterbored surface formed in the lower side of said mounting member, a contact ring slidably mounted on the upper surface of said disk, a circular inner contact wall axially centrally formed on said ring, the first said spherical outer surface and circular contact wall being in contact with each other, and actuating means including a pin and helical slot connection which is cooperatively constructed on said plate and ring whereby rotation of said plate causes said ring to move laterally against said circular longitudinal flange to incline the axis of said lens.

4. An inclinable lens mounting for photogrammetric projectors as set forth in claim 3 wherein said pin and slot connection comprises a pair of radially expanding helical and parallel cam surfaces which define the edges of a helical slot which is formed in said circular actuating plate, and further comprises a cam follower pin having a shank portion which is secured in said contact ring so as to engage in said slot whereby rotation of the actuating plate causes lateral movement of the ring to tilt the lens holding member.

5. A tiltable type of lens mounting for photogrammetric apparatus comprising a lens holder in which an objective is secured, a support member in which said lens holder is secured, said member having a spherical outer surface which is centered at a nodal point of said objective, a socket member, a circular frusto-conical surface which is formed in a central opening in said socket member and on which said spherical surface is adapted to rest so as to provide therewith a ball and socket type connection whereby the axis of said objective may be tilted, a pivot pin which is axially aligned with a nodal point in said objective and furthermore is aligned with the center of said spherical surface, and said pin being fixed in said socket member, a plurality of mutually parallel walls which form a straight longitudinal slot in said spherical outer surface, the pair of walls being slidably fitted to said pivot pin so that the support member may also be tilted, means for tilting said support member about said nodal point, said means comprising a longitudinal flange formed on the lower end of said support member, a spherical surface formed on the periphery of said longitudinal flange, a contact ring on which a cylindrical surface is centrally formed for contact with the last said spherical surface, a radial flange formed on said contact ring, a mounting member including tandem upper and lower rings, each having thickened rim portions, means for detachably joining said rim portions together, two companion circular interengaging swivel connector elements cooperatively formed on the adjacent parts of said upper ring and socket member to swively support said mounting member for selective angular adjustments in azimuth, an inwardly directed shoulder formed on said lower ring and a vertical cylindrical wall formed contiguously thereto, a circular flat actuating disk rotatably mounted on said shoulder within said last-named wall, a plate-like flange formed parallel to said actuating disk on said upper ring and spaced vertically therefrom so as to allow said radial flange to slide freely therebetween, a plurality of mutually parallel sides formed in said plate-like upper flange so as to provide a pair of opposite open-ended and radially aligned slots therein, a pair of erect guide pins fixed in said radial flange oppositely to each other and projecting into and slidably fitting said radial slots to guide the lateral motion of said contact ring, a pair of parallel-spaced radially expanding cam surfaces formed in said actuating plate in the vicinity of said radial flange, and a cam follower member seated firmly in said radial flange and engaging in said helical slot so that rotation of the actuating plate causes lateral movement of the lower end of said lens holder which results in tilting of said objective, and the direction in azimuth of said movement is adjusted by turning the mounting member.

References Cited by the Examiner

UNITED STATES PATENTS 2,723,593  11/1955  Gruner _____ 88—24
2,727,432  12/1955  Kelsh _____ 88—57 X
2,737,846  3/1956   Beau _____ 88—24

NORTON ANSHER, *Primary Examiner.*